June 11, 1940.  F. E. LANGE  2,203,791
STEERING WHEEL
Filed Dec. 12, 1936  2 Sheets-Sheet 1
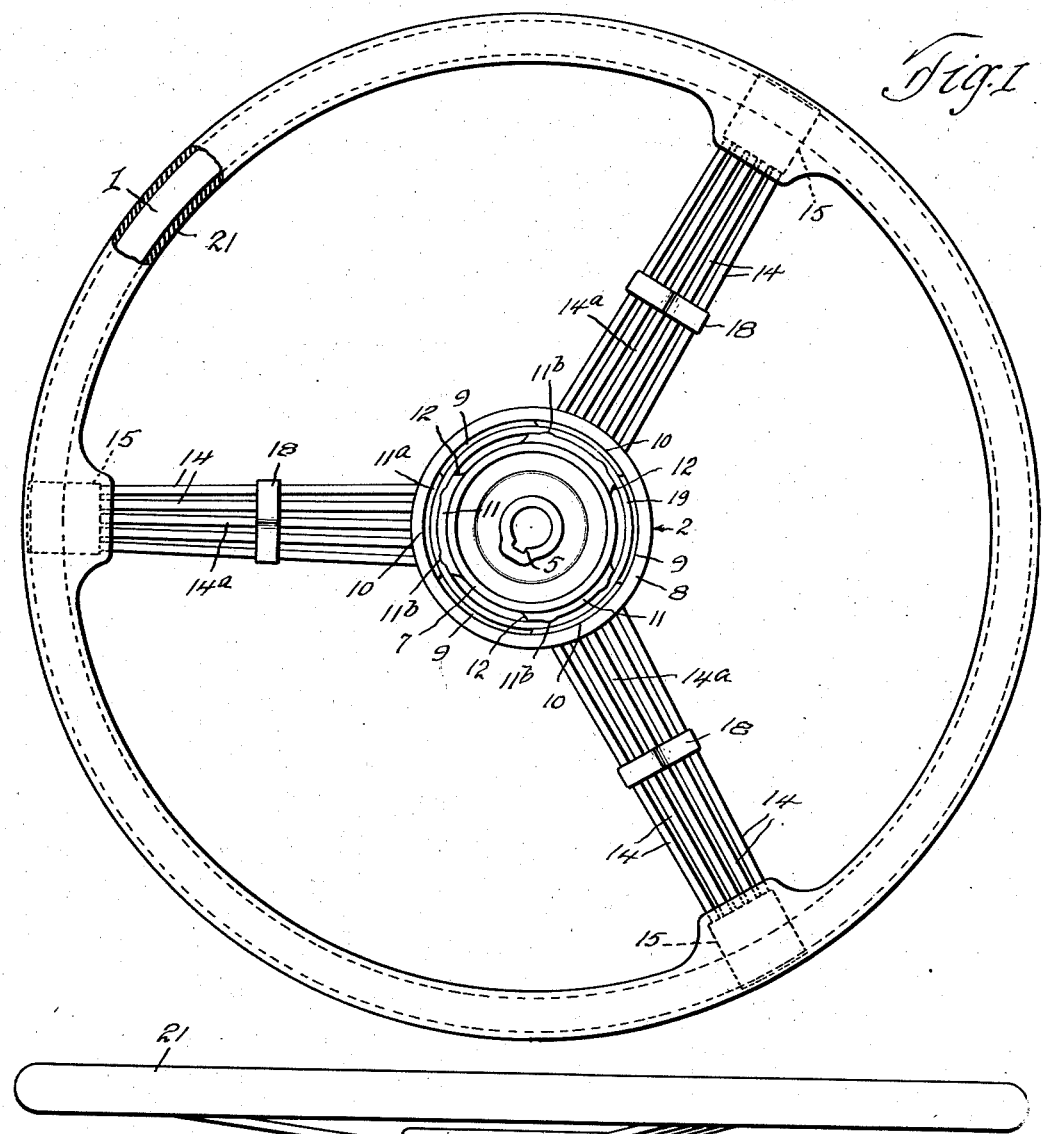
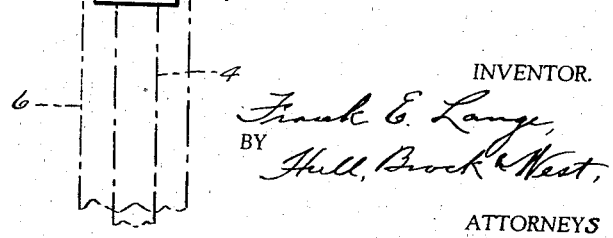
INVENTOR.
Frank E. Lange,
BY
ATTORNEYS

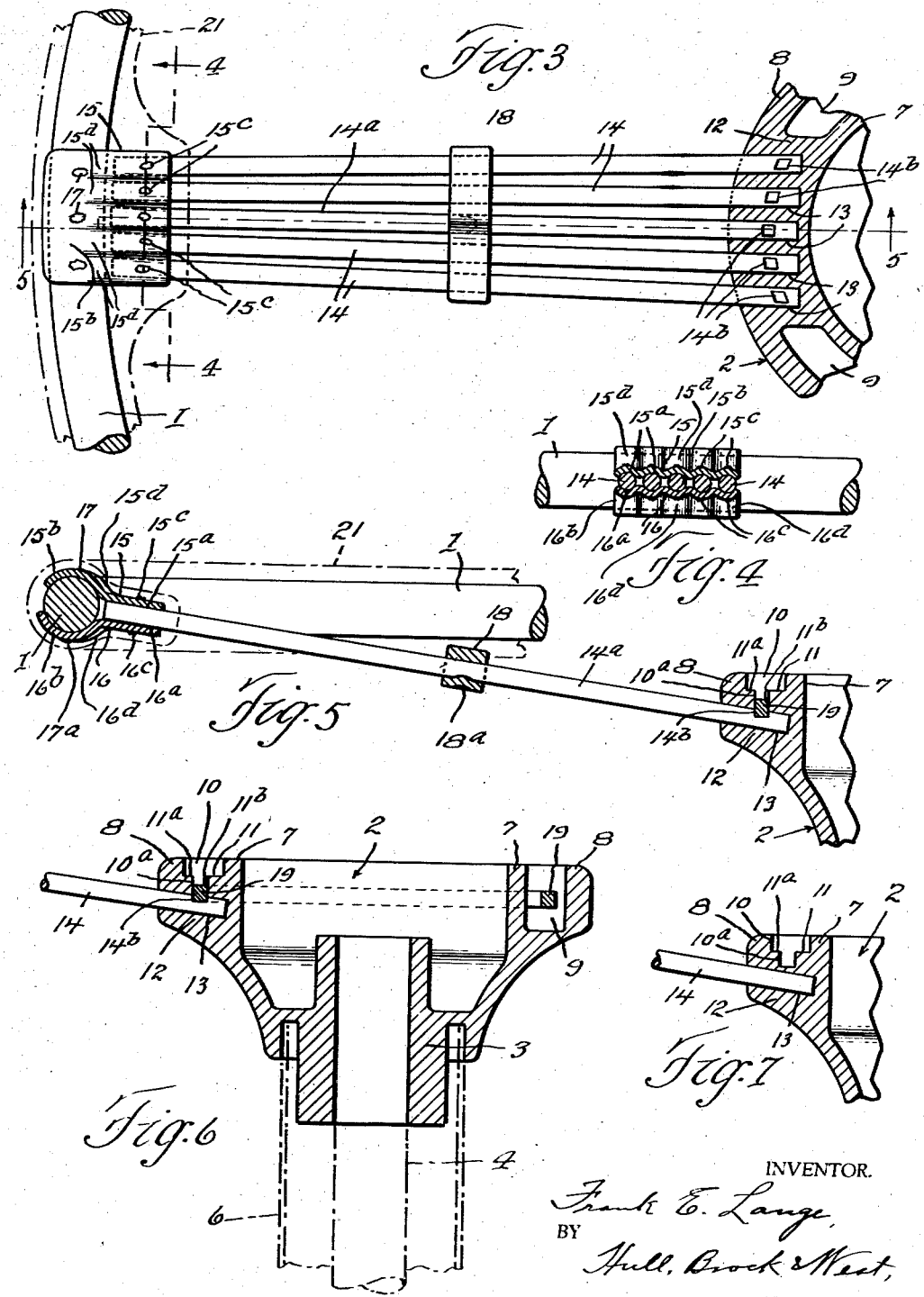

Patented June 11, 1940

2,203,791

UNITED STATES PATENT OFFICE 2,203,791

STEERING WHEEL

Frank E. Lange, Cuyahoga Falls, Ohio

Application December 12, 1936, Serial No. 115,482

7 Claims. (Cl. 74—552)

This invention relates to steering wheels such as are used on automotive vehicles and more particularly to wheels wherein the spokes thereof are composed each of an assembly of a plurality of spoke rods the inner ends of which are united to a hub while the outer ends are suitably secured to a rim. My invention contemplates improvements in the manner of connecting the inner ends of these spoke rods to the hubs and the outer ends to the rims, whereby increased strength is provided at these points of connection, convenience of assembly is facilitated, and the cost of production is materially reduced.

I accomplish the foregoing objects in and through the construction and arrangement of parts shown in the drawings, wherein Fig. 1 represents a plan view of a steering wheel constructed in accordance with my invention, with the hub cap or cover removed; Fig. 2 a side elevation of the steering wheel, showing the steering column and its housing in dot-and-dash lines; Fig. 3 a detail in plan and in section showing a portion of the hub and rim and a spoke assembly connecting the same, the cover for the rim being shown in dot-and-dash lines; Fig. 4 a detail in section corresponding to the line 4—4 of Fig. 3; Fig. 5 a detail in section corresponding substantially to the line 5—5 of Fig. 3; Fig. 6 a detail in section through the hub, showing one of the spoke rods and the locking ring, the steering column and its housing being indicated by dot-and-dash lines; Fig. 7 a detail in section through the hub, showing the position of one of the spoke rods prior to the operations whereby the locking ring is applied to said spoke rod.

Describing the parts by reference characters, 1 denotes the inner member of the rim, being composed of a rod bent to circular form and having its ends suitably connected, as by electric welding. 2 denotes the hub generally. This hub is preferably formed as a die casting and, as shown, comprises a central sleeve 3 by means of which it is connected to the steering column 4, as by being keyed thereto, as indicated at 5 (Fig. 1).

Surrounding the steering column is the housing 6, shown in dot-and-dash lines in Figs. 2 and 6. The hub is flared upwardly and outwardly and is provided at its top with a groove forming an inner rim 7 and an outer rim 8. As shown herein, the groove comprises three deep sections 9, substantially rectangular in section, and three shallow sections 10, 10$^a$, the upper portions 10 of which are of the same width as the upper portions of the groove sections 9, but the lower portions 10$^a$ of which are contracted in width and constitute slots, as shown more particularly in Fig. 7, each portion 10 and 10$^a$ being also substantially rectangular in section and the tops of the groove sections or slots 10$^a$ being defined by the horizontal shoulders 11, 11$^a$, which may be considered as constituting the bottoms of the groove sections 10.

It will be noted that the narrow groove sections or slots 10$^a$ are formed in segmental ribs 12 that are cast with the inner and outer rim members 7 and 8, between the groove segments 9. The segmental ribs 12 are of sufficient circumferential length to constitute supports for the inner ends of the rods of a spoke assembly. Three such spoke assemblies and three such ribs are shown in the drawings, although it will be obvious that the number of these may be varied if found desirable or necessary. The deepening of the groove sections 9 effects a saving in weight and in the material employed in the hub.

Extending into each rib 12 are the bores 13, preferably cast thereinto, each rib being provided with a sufficient number of the bores to accommodate all of the individual members of a spoke assembly and the bores extending below the bottoms of the grooves 10$^a$.

As shown herein, each spoke or spoke assembly comprises a plurality of rods 14 having their outer ends secured to the inner rim member 1 by means of the upper and lower clips 15 and 16, each clip having concave partial seats 15$^a$ and 16$^a$ formed therein for the reception of the outer ends of the spoke rods and each having a concaved flange 15$^b$ and 16$^b$ at its outer end by means of which the upper and lower clip members may be secured to the inner member of the rim, as by being spot welded thereto, as indicated at 17, 17$^a$. The outer ends of the spokes are connected to the clip members 15 and 16 by being spot welded thereto, as indicated at 15$^c$ and 16$^c$. The concave partial seats 15$^a$ and 16$^a$ are formed between ribs which project upwardly and downwardly from the clip members 15 and 16, respectively. These ribs are extended along the respective flanges 17 and 17$^a$, as indicated at 15$^d$ and 16$^d$, respectively, thereby to reinforce the bends formed at the junctions of these flanges with the bottoms of the clips and prevent the breaking or bending of the clips at such junctions. 18 denotes a bar located intermediate the ends of the spoke rods and through which the latter extend, the middle spoke rod 14$^a$ being rigidly connected thereto, as by peening the underside of the bar thereto, as shown at 18$^a$.

The inner ends of the spoke rods are locked to the hub by means of a split locking ring 19, which is applied thereto in connection with the process of manufacturing the wheel, which will now be described.

The hub having been die cast, with the ribs 12 and channel sections 9 and 10 and slots 10a and with the bores 13 extending into said ribs below the slots, and the spoke rods having been inserted into the bores provided therefor in the bar 18, the inner ends of the spoke rods are inserted into the said bores and the slots 10a are then deepened and widened somewhat by means of a suitable tool in a drill press or lathe, the slots being extended downwardly into the upper surfaces of the inner ends of the spoke rods, to form seats, as shown at 14b, after which the split locking ring 19 is forced into the slots thus extended and into the seats formed in and extending across the tops of the spoke rods. In practice it is preferred to die-cast the slots 10a somewhat narrower than the thickness of the locking ring and to cut the slots to proper width and depth, thereby to insure a snug fit of the locking ring between the walls of the slot thus finished and widened. After the ring has been thus inserted, it is secured in place, as by peening outwardly the inner shoulders 11, as shown at 11b, Fig. 1.

The lower clips 16 having been spot welded to the under side of the steering wheel member 1, the outer ends of the spoke rods are then inserted into the partial seats formed in the upper surfaces of the said clips. The upper clips are then spot welded to the rim member and both the upper and the lower clips are spot welded to the outer ends of the spoke rods. It will be noted that the spoke rods are somewhat shorter than the distance between the rim member 1 and the seats for their inner ends, thereby to insure sufficient clearance between the outer ends of the spoke rods and the said rim member. Finally the metallic rim member is provided with a suitable covering 21 molded therearound and enclosing the clips 15 and 16.

The terms "upper" and "lower" have been employed herein and in the claims for convenience in describing the locations of the parts referred to, but without any intention of limiting the scope of my invention except as such limitation may be rendered necessary by the specific environment or by the prior state of the art.

Having thus described my invention, what I claim is:

1. A steering wheel comprising in combination an outer rim member, a central hub, assemblies of spoke rods extending between the rim member and the hub, means for securing the inner ends of the spoke rods to the hub, and means for securing the outer ends of the spoke rods to the rim member, the latter means comprising a lower supporting member for the outer ends of the spoke rods of each assembly, the said supporting member being secured to the lower surface of the rim member and having partial seats therein for the outer ends of the spoke rods, an upper supporting member complementary to each lower member and having partial seats therein for the upper surfaces of the outer ends of the spoke rods, and means securing the outer ends of the spoke rods to said supporting members.

2. A steering wheel comprising, in combination, an outer rim member, a central hub, assemblies of spoke rods extending between the rim member and the hub, means for securing the inner ends of the spoke rods to the hub and means for securing the outer ends of the spoke rods to the rim member, the latter means comprising a lower supporting member for the outer ends of the spoke rods of each assembly, each of said supporting members having an upwardly concave flange secured to the lower surface of the rim member and a body portion extending from said flange toward said hub, an upper supporting member complementary to each lower member and each having a downwardly concave flange secured to the upper surface of the rim member, the body portion of each lower member having ribs depressed therefrom forming partial seats for the lower surfaces of the outer ends of the spoke rods and the body portion of each upper member having ribs projected upwardly therefrom to provide partial seats for the upper surfaces of the outer ends of the spoke rods, the said ribs being extended across the junction of the body portions of the supporting members with the flanges thereof and onto said flanges.

3. A steering wheel comprising in combination an outer rim member, a central hub, assemblies of spoke rods extending between the rim member and the hub, means for securing the inner ends of the spoke rods to the hub, and means for securing the outer ends of the spoke rods to the rim member, the latter means comprising a lower supporting member for the outer ends of the spoke rods of each assembly, an upper supporting member complementary to each lower supporting member, means for securing the upper and lower supporting members respectively to the upper and the lower surface of the rim member, and means for securing the outer ends of the spoke rods to the seats provided therefor by and between the said supporting members.

4. In the steering wheel set forth in claim 3, the upper and lower supporting members being integrally united to the upper and the lower surface, respectively, of the rim member, and the outer ends of the spoke rods being integrally united with the seats provided therefor by and between the said supporting members.

5. A steering wheel comprising in combination an outer rim member, a central hub, assemblies of spoke rods extending between the rim member and the hub, means for securing the inner ends of the spoke rods to the hub, and means for securing the outer ends of the spoke rods to the rim member, the latter means comprising a lower supporting member for the outer ends of the spoke rods of each assembly, the said supporting member being secured to the lower surface of the rim member and having ribs projecting upwardly therefrom and providing concavities therebetween for the reception of the spoke ends, an upper supporting member complementary to each lower member and adapted to engage the upper surfaces of the outer ends of the spoke rods, and means securing the outer ends of the spoke rods within the seats provided therefor by the concavities between the ribs of the lower supporting member.

6. In the steering wheel set forth in claim 5, the upper and lower supporting members being spot welded to the upper and the lower surface, respectively, of the rim member, and the outer ends of the spokes being secured by spot welding within the seats provided therefor by the concavities between the ribs of the lower supporting member.

7. A steering wheel comprising in combination an outer rim member, a central hub, assemblies of spoke rods extending between the rim member and the hub, means for securing the inner ends of the spoke rods to the hub and means for securing the outer ends of the spoke rods to the rim member, the latter means comprising upper and lower supporting members for the outer ends of the spoke rods of each assembly and projecting radially inwardly from and secured to the rim member, and means for securing the outer ends of the spoke rods to and between their respective supporting members.

FRANK E. LANGE.